ively. The patent for PROCESS FOR THE PURIFICATION OF WASTE LIQUORS IN THE PRODUCTION OF PHENOL-FORMALDEHYDE RESINS

United States Patent [19]
Babina et al.

[11] 4,212,775
[45] Jul. 15, 1980

[54] PROCESS FOR THE PURIFICATION OF WASTE LIQUORS IN THE PRODUCTION OF PHENOL-FORMALDEHYDE RESINS

[76] Inventors: Margarita D. Babina, ulitsa Vostochnaya, 40, kv. 18, Sverdlovsk; Egor F. Vlaskin, Ruzheiny pereulok, 4, kv. 57, Moscow; Evgeny S. Dunjushkin, ulitsa Vyazovskaya, 9, kv. 77, Nizhny Tagil, Sverdlovskoi oblasti; Anna P. Gabets; Ida I. Pereskokova, both of ulitsa Vostochnaya, 40, kv. 18, Sverdlovsk; Galina I. Popova, Bankovsky pereulok, 3, kv. 4, Sverdlovsk; Valentina A. Glumova, ulitsa Sovetskaya, 51, kv. 134, Sverdlovsk; Ljudmila A. Naumova, ulitsa Gagarina, 49/1, kv. 3, Sverdlovsk; Galina G. Poprygo, ulitsa Moskovskaya, 76a, kv. 3, Sverdlovsk, all of U.S.S.R.

[21] Appl. No.: 841,984
[22] Filed: Oct. 13, 1977
[51] Int. Cl.$^2$ ............................................. C08L 1/02
[52] U.S. Cl. .................................. 260/17.2; 260/17.3; 568/724; 568/758
[58] Field of Search ........................... 260/17.2, 17.3; 568/724, 758

[56] References Cited
U.S. PATENT DOCUMENTS

| | | | |
|---|---|---|---|
| 2,247,523 | 7/1941 | Schick et al. | 568/758 |
| 2,343,165 | 2/1944 | Adler | 568/758 |
| 3,215,653 | 11/1965 | Hughes | 260/17.2 |
| 3,290,390 | 12/1966 | Prahl et al. | 568/724 |
| 3,575,884 | 4/1971 | Seiler | 568/758 |

OTHER PUBLICATIONS

Chem. Absts: vol. 81 (1974) 111220p, "Purification of Water from the Production Phenol-Formaldehyde Resins", Krasnoselov et al.
Chem. Absts., vol. 79: 96677f, Apparatus for the Purification of Waste Water, Adegeest.
Chem. Abst., vol. 72: 101365q, Separation of Phenolic Compounds from Reaction Mixtures, Moss et al.

*Primary Examiner*—Edward M. Woodberry
*Attorney, Agent, or Firm*—Robert E. Burns; Emmanuel J. Lobato; Bruce L. Adams

[57] ABSTRACT

The process comprises isolating phenol and partially formaldehyde wherein molar ratio thereof is from 1:1.4 to 1:3.5 at a pH of from 0.65 to 0.8 in the presence of a vegetable sorbent, such as saw-dust, at the boiling point. The resultant product of reaction of phenol and formaldehyde with components of the sorbent is separated from the liquid phase and used. Methanol is removed from the liquid phase, whereafter residual formaldehyde is isolated therefrom by adding a condensation component selected from phenol and urea and a vegetable sorbent. The process is conducted at 60°–100° C. at a pH of from 0.65 to 10. The resultant product of reaction of the phenolic component, formaldehyde and components of the sorbent is also used.

The process enables the purification degree of waste liquors from toxic substances to be as high as 98-99%, and makes it possible to obtain a useful product.

11 Claims, No Drawings

PROCESS FOR THE PURIFICATION OF WASTE LIQUORS IN THE PRODUCTION OF PHENOL-FORMALDEHYDE RESINS

FIELD OF THE INVENTION

The invention relates to the field of environment control, and more specifically to a process for the purification of waste liquors in the production of phenol-formaldehyde resins.

In the production of phenol-formaldehyde resins, 0.6–0.9 tons of waste liquors containing toxic substances, such as phenol, formaldehyde, methanol and the like in amounts requiring their isolation or destruction are released per ton of the product.

BACKGROUND OF THE INVENTION

Processes are known in the art for the purification of waste liquors in the production of phenol-formaldehyde resins by isolating phenol by way of extraction with the aid of solvents.

It is known to isolate phenol in the form of an oily film by adding ammonium salts and a strong acid to waste liquors.

Processes for the purification of waste liquors from phenol using adsorbents have been disclosed.

It is known to purify waste liquors from phenol by boiling, with dephlegmation of steam. With autoclaving and high pressure and temperature, the degree of phenol extraction reaches 99.4%.

Processes are known in the art for the purification of waste liquors from aldehyde.

All the known processes involve purification of waste liquors only from either phenol, or formaldehyde or from a mixture thereof, yet the known processes cannot provide for the purification from other noxious substances present in waste liquors. In addition, the degree of purification is inadequate.

Waste liquors in the production of phenol-formaldehyde resins also contain methanol, a catalyst and formic acid which are introduced with the feedstock for the production of resin, as well as products formed during the preparation of the resin.

It is known that waste liquors in the production of phenol-formaldehyde resins contain a considerable excess of formaldehyde and much water.

For recovery of phenol and formaldehyde from waste liquors, they should be subjected to a secondary polycondensation, excess water should be removed, and a useful product obtained. However, in order to obtain a product (resin) suitable for further utilization, the molar ratio of phenol to formaldehyde should be close to the equimolar ratio, and water should be removed under mild conditions.

A process is known in the art for the purification of waste liquors in the production of phenol-formaldehyde resins, wherein phenol is added to waste liquors containing phenol and formaldehyde in the molar ratio of 1:4.18 in an amount such that the phenol-to-formaldehyde ratio is from 1:1.02 to 1:1.12. The purification process is conducted in two stages. At the first stage, the mixture is heated at 80°–85° C. for at least 30 hours, and then, at the second stage, water is removed at a temperature not exceeding 116° C. to prevent the formation of resite.

The resultant liquid resin may be used in the production of ordinary novolac resin.

The disadvantage of the above-described process resides in the high consumption rate of costly phenol (109 kg per ton of waste liquor), long processing time (the first stage taking from 30 hours to several days) and, hence, high power inputs. The process is very complicated because it involves stringent maintenance of preset temperature conditions at all stages.

A further process known in the art is the purification of waste liquors in the production of phenol-formaldehyde resins, wherein phenol, formaldehyde and an acid are added to waste liquors containing 2.88% of phenol and 1.77% of formaldehyde to obtain a phenol-to-formaldehyde molar ratio of 1:1; then an adsorbent in the form of saw-dust is added, and the mixture is heated. Polycondensation is conducted during three hours. The resultant product is isolated from the liquid phase and utilized.

The liquid phase is passed through saw-dust during 1.6 hours, whereafter it contains 0.15% of phenol and 0.89% of formaldehyde.

The disadvantage of this process resides in the high content of phenol and formaldehyde and presence of methanol in the resultant waste liquors, the need for the addition of costly phenol, formaldehyde and acid, and subsequent filtering of waste liquors after polycondensation, as well as in the processing at low pH (0.47) which leads to intensification of hydrolysis of wood.

OBJECT OF THE INVENTION

It is an object of the invention to provide an efficient process for the purification of waste liquors in the production of phenol-formaldehyde resins, which enables a high degree of extraction of all toxic substances present in waste liquors.

SUMMARY OF THE INVENTION

The process for the purification of waste liquors in the production of phenol-formaldehyde resins comprising isolating phenol and formaldehyde from waste liquors by sorption with the aid of a vegetable sorbent and polycondensation in an acid medium under heating, according to the invention, comprises:

(a) isolating phenol and partially formaldehyde wherein the molar ratio thereof is from 1:1.4 to 1:3.5 in the presence of a vegetable sorbent at a pH of from 0.65 to 0.8 at the boiling point during a period of time sufficient for bonding phenol whereby a useful product is formed as a result of the reaction of phenol and formaldehyde with components of the sorbent and subsequently isolating the product from the liquid phase;

(b) isolating methanol from the liquid phase and (c) isolating residual formaldehyde from the liquid phase from which methanol has been removed, by sorption and polycondensation in the presence of a vegetable sorbent with the addition of a phenolic component in an amount sufficient for bonding formaldehyde at 60°–100° C., whereby a useful product is formed as a result of of reaction of the phenolic component and formaldehyde with components of the sorbent.

The invention enables the degree of purification of waste liquors in the production of phenol-formaldehyde resins to be as high as 98–99%. There are substantially no wastes in the process of purification. Products resulting from the purification may be used in the production of polymeric materials.

DETAILED DESCRIPTION OF THE INVENTION

According to the invention, the purification is conducted with a molar ratio of phenol to formaldehyde in waste liquors from 1:1.4 to 1:3.5. Thus maximum removal of phenol and partial removal of formaldehyde is achieved. With the formaldehyde content in waste liquors below 1.4 moles per mole of phenol, maximum bonding of phenol cannot be achieved. With the formaldehyde content in waste liquors above 3.5 moles per mole of phenol, bonding of phenol is not increased, while the content of formaldehyde in the liquid phase increases, which is undesirable. Therefore, deviations from the above-mentioned range of the phenol-to-formaldehyde ratio cannot improve the result.

As mentioned above, the process at stage "a" is conducted at a pH from 0.65 to 0.8. The above-mentioned range of pH of is an optimum one for the extraction of phenol and partially formaldehyde in the presence of a vegetable sorbent. With a pH below 0.65, undesirable intensification of hydrolysis of the vegetable sorbent occurs. With a pH above 0.8, the content of phenol and formaldehyde in the liquid phase increases. Thus, deviations from the above range of pH cannot improve the result.

Under the conditions according to the invention, sorption of phenol and formaldehyde on a vegetable sorbent occurs, and the reaction of phenol and formaldehyde with sorbent components takes place. The resultant product is isolated, e.g. by filtering, from the liquid phase and used in the production of polymeric materials. Methanol is removed from the liquid phase by distillation with live steam.

After the removal of methanol, the liquid phase contains a small quantity of formaldehyde which is isolated at 60°–100° C. in the presence of a vegetable sorbent with the addition of a phenolic component in an amount sufficient for bonding formaldehyde. A product of reaction of the phenolic component, formaldehyde and components of the vegetable sorbent is formed, which is separated by filtering, centrifugation or distillation. The phenolic component may comprises phenol, whereupon the process is conducted at a pH of from 0.65 to 0.8 as the boiling point. The phenolic component also may comprise urea. In such case, the process is conducted at a pH of from 8 to 10 at 60°–100° C.

The vegetable sorbent may comprise saw-dust, cotton husks and other appropriate vegetable feedstock. The amount of the sorbent at stage "a" is from 8 to 10% by weight of the liquid phase. At stage "c", the amount of the sorbent, in case phenol is added, is from 8 to 10% by weight, and in case urea is added, it is from 25 to 40% by weight. The processing time at stage "a" is from 3 to 4 hours; at stage "c," from 3 to 4 hours in case phenol is added, and from 1.5 to 2 hours in case urea is added.

The process is carried out in the following manner.

The purification is conducted in three stages.

Stage "a". Waste liquors in the production of phenol-formaldehyde resins to be purified are treated to bring the pH from 0.65 to 0.8 and the molar ratio of phenol to formaldehyde from 1:1.4 to 1:3.5, whereafter the liquors are fed to a reactor having a heater, a stirrer and a reflux condenser, and saw-dust is loaded into the reactor. The contents of the reactor are stirred, heated to the boiling point and allowed to stay at this temperature for 2.5 hours. During this time, substantially complete extraction of phenol and partial extraction of formaldehyde take place by sorption on the sorbent and polycondensation. After the above-mentioned period, heating of the reactor is interrupted, and the reactor contents are fed for filtering to separate the liquid phase. The resultant solid product is a wood material modified with phenol-formaldehyde resin containing chemically bonded wood components. This product may be used for the preparation of polymeric materials.

Stage "b". The liquid phase is fed after isolation of the above-mentioned product, to a rectification column to distill off methanol.

Stage "c". The liquid phase from which methanol has been removed, is fed to an intermediate container, the content of residual formaldehyde is determined, and a required quantity of a condensation component, such as phenol or urea, is added. The condensation component is used in an amount sufficient for bonding formaldehyde. The liquid phase is then fed from the intermediate container to a reactor. The condensation also component may be introduced as well into the reactor. Saw-dust is added to the reactor. In case phenol is used, the amount of the sorbent is from 8 to 10% by weight, and the process is conducted at pH from 0.65 to 0.8 at 98°–99° C. during 2.5 hours; in case urea is added, the amount of the sorbent is from 25 to 40% by weight, and the process is conducted, at a pH of from 8 to 10 at 60°–100° C. during 1.5–2.5 hours.

After the above-mentioned period, the heating of the reactor is interrupted, a solid product is separated and used for the preparation of polymeric materials.

The invention enables purification of waste liquors in the production of phenol-formaldehyde resins from all toxic components contained therein to the extent of 98–99%.

The invention enables the obtaining of a number of products suitable for the preparation of polymeric materials.

The invention makes it possible to use saw-mill wastes in the form of saw-dust, reduce the purification time, lower the consumption of costly phenol for purification of waste liquors and simplify the process for the purification of waste liquors in the production of phenol-formaldehyde resins.

Therefore, the use of the invention provides for efficient purification of waste liquors with concurrent utilization of components thereof, as well as of saw-mill wastes, with the formation of products suitable for the preparation of polymeric materials.

EXAMPLE 1

Purification was conducted in three stages: at stage "a" phenol and partially formaldehyde were isolated, at stage "b" methanol was isolated, and at stage "c" residual formaldehyde was isolated.

Stage "a". 4 tons of waste liquors containing 4% of phenol and 2.16% of formaldehyde (molar ratio 1:1.66) at pH 1.8 were fed to a 5.5 m$^3$ reactor having a steam heater, a stirrer and a reflux condenser, and the pH was brought to 1.8 by adding hydrochloric acid. After stirring for 15 minutes, 400 kg of saw-dust with a particle size of 2 mm (based on abs.dry weight) were added to the reactor under stirring. The mixture was heated to the boiling point (98°–99° C.), and polycondensation was conducted for 2.5 hours, phenol and formaldehyde being sorbed on saw-dust and reacting with each other and with wood components to form a useful product. Then the heating was interrupted, and the resultant product was separated by centrifugation from the liquid phase. The resultant product was used for the preparation of polymeric materials. The liquid phase separated from the product contained 0.07% of phenol, 1.2% of formaldehyde, 5.7% of methanol and 1.3% of wood decomposition products. Phenol extraction was 98.5%.

Stage "b". The liquid phase (filtrate) was fed to a rectification column to remove methanol. The content of methanol after rectification was 0.25%.

Stage "c". The liquid phase was fed, after removal of methanol, to an intermediate container, and the content of residual formaldehyde was determined to be 1.2%.

The liquid phase free of methanol, containing 1.2% of formaldehyde was fed in an amount of 3400 kg to a reactor, and 68 kg of crystalline phenol, hydrochloric acid in an amount to bring pH to 0.73, and 340 kg of saw-dust (based on abs.dry weight) were added to the reactor. The mixture was heated to 98°–99° C. and allowed to stay at this temperature for 2.5 hours. The reactions of phenol, formaldehyde and components of wood take place, giving a product similar to that described above. The product was separated from the liquid phase. The content of phenol in the liquid phase was 0.1% and the content of formaldehyde was 0.17%. The liquid phase was fed for biopurification.

EXAMPLE 2

Stages "a" and "b" were conducted as described in Example 1.

Stage "c" was conducted in the following manner. 265 l of the liquid phase obtained at stage "b" containing 1.5% of formaldehyde were charged in a steam-heated stirrer, and 19 kg of urea, 28 kg of 37% aqueous solution of formaldehyde and 100 kg of saw-dust similar to that described in Example 1 were added.

Prior to addition of saw-dust, the pH of the solution was brought to 8–10 by adding a solution of caustic soda. The mixture was heated to 100° C., and polycondensation was conducted during 90 minutes. For complete bonding of formaldehyde, 3 kg of urea were added, and 10 minutes after than, the product was neutralized to a pH of 8–9, and water was distilled off to obtain a volatiles content of 8–10% by weight.

The resultant product was used for the preparation of polymeric materials. The distillate was fed for biopurification.

EXAMPLE 3

Stages "a" and "b" were conducted as described in Example 1. Stage "c" was conducted as described in Example 2, the only difference being that polycondensation was conducted at 60° C. during 150 minutes. The distillate contained 0.048% of formaldehyde in this case. The distillate was fed for biopurification.

EXAMPLE 4

Stage "a" was conducted as described in Example 1. Waste liquors for purification containing 1.97% by weight of phenol, 2.08% by weight of formaldehyde (molar ratio 1:3.5) at a pH of 1.9 were fed to the above-described reactor, and the pH was brought to 0.65. Saw-dust was fed to the reactor in an amount of 333 kg (based on abs.dry weight).

The liquid phase obtained after the stage "a" contained 0.02% of phenol and 1.4% of formaldehyde, 5.1% of methanol and 1.42% of wood decomposition products. Phenol extraction was 99%.

Stages "b" and "c" were conducted as described in Example 2.

What is claimed is:

1. A process for the purification of waste liquors in the production of phenol-formaldehyde resins, comprising:
   (a) isolating phenol and partially formaldehyde from waste liquors, in which the molar ratio of phenol and formaldehyde is from 1:1.4 to 1:3.5 by sorption and polycondensation in the presence of a vegetable sorbent, in an amount such that the phenol and formaldehyde are sorbed thereon and after reaction of the phenol and formaldehyde with each other and with components of said sorbent a useful product is formed, at a pH of from 0.65 to 0.8 at the boiling point for a time period sufficient for bonding phenol and to form a useful product as a result of the reaction of phenol and formaldehyde with components of said sorbent, and subsequently separating said product from the liquid phase;
   (b) removing methanol from the liquid phase and
   (c) isolating residual formaldehyde from the resulting liquid phase from which methanol has been removed, by sorption and polycondensation in the presence of a vegetable sorbent at 60°–100° C. wherein a condensation component is added which is selected from the group consisting of phenol and urea in an amount sufficient to bond formaldehyde and to form a useful product as a result of the reaction of the condensation component, formaldehyde and components of the vegetable sorbent and wherein the sorption and polycondensation are carried out at a pH of 0.65–0.8 when said condensation component is phenol and at a pH of 8–10 when said condensation component is urea and separating the resultant product.

2. A process according to claim 1, wherein the condensation component at stage "c" comprises phenol, and the process is conducted at pH from 0.65 to 0.8 at the boiling point.

3. A process according to claim 2, wherein the amount of said sorbent is from 8 to 10% by weight of said waste liquors in steps "a" and "c".

4. A process according to claim 1, wherein the condensation component at stage "c" comprises urea, and the process is conducted at pH from 8 to 10 at 60°–100° C.

5. A process according to claim 4, wherein the amount of said sorbent is from 25 to 40% by weight of said waste liquors in step "c".

6. A process according to claim 5, in which said sorbent is present in step "a" in an amount of about 8–10% by weight of said waste liquors.

7. A process according to claim 1 in which said methanol is removed by steam distillation.

8. A process according to claim 1 in which after removal of said methanol, the content of methanol in said waste liquors is about 0.25% by weight.

9. A process according to claim 1 in which said sorption and polycondensation in stage "a" is carried out for a period of about 2.5 hours.

10. A process according to claim 1 in which in step "c" said sorption and polycondensation are carried out for about 2.5 hours with phenol is added as said condensation component and for about 1.5 to 2.5 hours wherein urea is added as said condensation component.

11. A process according to claim 1 wherein the sorbent is selected from the group of sawdust and cotton husks.

* * * * *